US011832291B2

(12) United States Patent
Li et al.

(10) Patent No.: US 11,832,291 B2
(45) Date of Patent: Nov. 28, 2023

(54) DETECTING ACTIVE SIDELINK BANDWIDTH PARTS ON COMPONENT CARRIERS

(71) Applicant: QUALCOMM Incorporated, San Diego, CA (US)

(72) Inventors: Qing Li, Princeton Junction, NJ (US); Junyi Li, Fairless Hills, PA (US); Hong Cheng, Basking Ridge, NJ (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/446,789

(22) Filed: Sep. 2, 2021

(65) Prior Publication Data
US 2023/0065413 A1  Mar. 2, 2023

(51) Int. Cl.
| | | |
|---|---|---|
| H04W 72/04 | (2023.01) | |
| H04W 72/542 | (2023.01) | |
| H04W 72/044 | (2023.01) | |
| H04W 72/1263 | (2023.01) | |
| H04W 72/20 | (2023.01) | |
| H04L 5/00 | (2006.01) | |

(52) U.S. Cl.
CPC ....... *H04W 72/542* (2023.01); *H04W 72/044* (2013.01); *H04W 72/1263* (2013.01); *H04W 72/20* (2023.01); *H04L 5/001* (2013.01)

(58) Field of Classification Search
None
See application file for complete search history.

(56) References Cited

U.S. PATENT DOCUMENTS

| | | | |
|---|---|---|---|
| 2020/0259627 A1* | 8/2020 | Loehr | H04W 4/70 |
| 2021/0045100 A1* | 2/2021 | Park | H04L 1/1812 |
| 2021/0051653 A1* | 2/2021 | Park | H04W 8/22 |
| 2021/0282143 A1* | 9/2021 | Lee | H04W 52/281 |
| 2022/0279527 A1* | 9/2022 | Lee | H04W 72/23 |
| 2022/0345282 A1* | 10/2022 | Back | H04W 72/04 |
| 2022/0353047 A1* | 11/2022 | Loehr | H04W 72/56 |
| 2022/0360421 A1* | 11/2022 | Liang | H04L 5/0053 |
| 2022/0386093 A1* | 12/2022 | Baek | G01S 5/0205 |
| 2022/0397633 A1* | 12/2022 | Baek | H04L 5/00 |

* cited by examiner

*Primary Examiner* — Kodzovi Acolatse
(74) *Attorney, Agent, or Firm* — Harrity & Harrity, LLP

(57) ABSTRACT

Various aspects of the present disclosure generally relate to wireless communication. In some aspects, a user equipment (UE) may receive a sidelink bandwidth part (BWP) configuration. The UE may detect an active sidelink BWP on a component carrier based at least in part on the sidelink BWP configuration. Numerous other aspects are described.

30 Claims, 8 Drawing Sheets

DETECTING ACTIVE SIDELINK BANDWIDTH PARTS ON COMPONENT CARRIERS

FIELD OF THE DISCLOSURE

Aspects of the present disclosure generally relate to wireless communication and to techniques and apparatuses for detecting active sidelink bandwidth parts (BWPs) on component carriers.

BACKGROUND

Wireless communication systems such as New Radio (NR) are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink and/or the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive a sidelink bandwidth part (BWP) configuration; and detect an active sidelink BWP on a component carrier based at least in part on the sidelink BWP configuration.

In some implementations, a method of wireless communication performed by a UE includes receiving a sidelink BWP configuration; and detecting an active sidelink BWP on a component carrier based at least in part on the sidelink BWP configuration.

In some implementations, a non-transitory computer-readable medium storing a set of instructions for wireless communication includes one or more instructions that, when executed by one or more processors of a UE, cause the UE to: receive a sidelink BWP configuration; and detect an active sidelink BWP on a component carrier based at least in part on the sidelink BWP configuration.

In some implementations, an apparatus for wireless communication includes means for receiving a sidelink BWP configuration; and means for detecting an active sidelink BWP on a component carrier based at least in part on the sidelink BWP configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
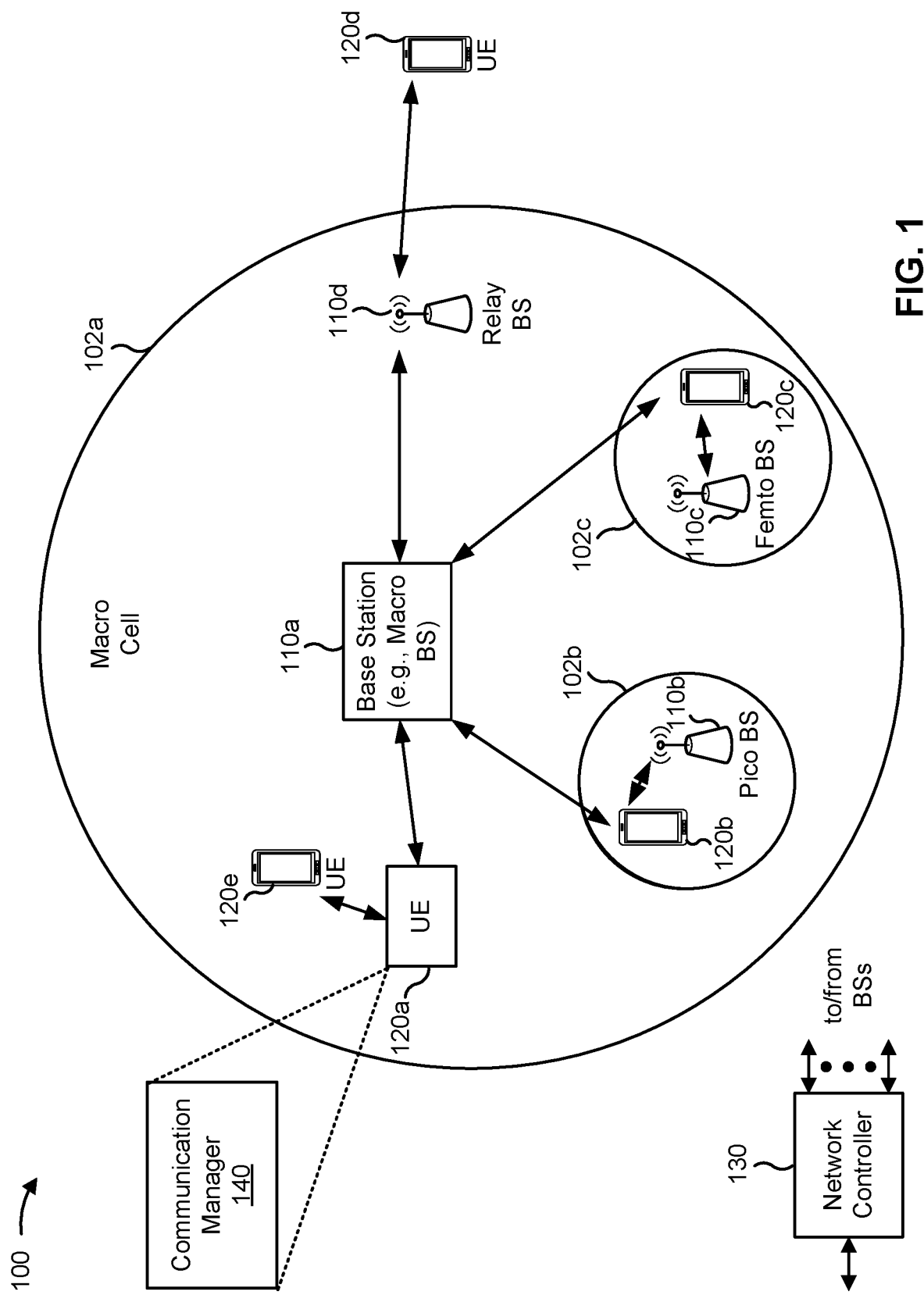
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive a sidelink bandwidth part (BWP) configuration; and detect an active sidelink BWP on a component carrier based at least in part on the sidelink BWP configuration. Additionally, or alternatively, the communication manager 140 may perform one or more other operations described herein.

As indicated above, FIG. 1 is provided as an example. Other examples may differ from what is described with regard to FIG. 1.

Figure 2:
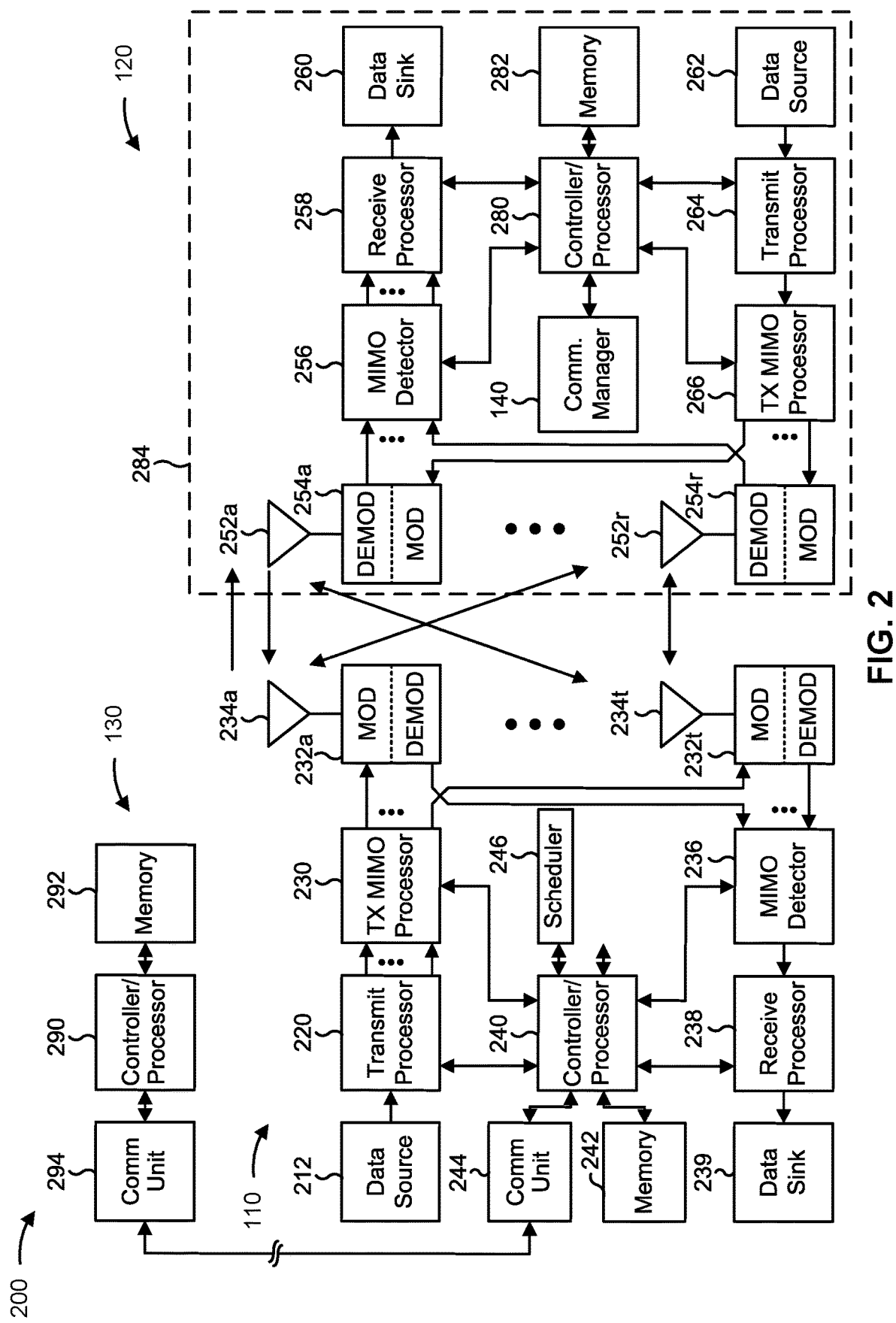
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information and control information (e.g., CQI requests, grants, and/or upper layer signaling) and provide overhead symbols and control symbols. The transmit processor 220 may generate reference symbols for reference signals (e.g., a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with detecting active sidelink BWPs on component carriers, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, a UE (e.g., UE 120) includes means for receiving a sidelink BWP configuration; and/or means for detecting an active sidelink BWP on a component carrier based at least in part on the sidelink BWP configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Bandwidth parts (BWPs) may be utilized for downlink and uplink communications. A UE may be configured with a maximum of four BWPs per carrier for a downlink and an uplink, respectively, but only one BWP may be active for the downlink and only one BWP may be active for the uplink per carrier at a specific time. A base station may configure the UE with the BWPs using various parameters, such as a BWP numerology, a BWP bandwidth size, a frequency location such as an NR absolute radio-frequency channel number (NR-ARFCN), and/or a control resource set (CORESET). The UE may receive and transmit within frequency ranges configured for active BWPs with associated numerologies.

A BWP may be utilized for sidelink communications. A single BWP for sidelink may be configured and activated for a plurality of UEs (e.g., all UEs) on a sidelink carrier, where only one carrier may be supported on sidelink for NR V2X (e.g., no multi-carrier may be supported on sidelink). The single BWP for sidelink may be configured and activated for the plurality of UEs for all communication types, such as unicast communications, groupcast communications, and/or broadcast communications. The single BWP for sidelink may be used for a variety of applications, such as V2X, industrial IoT, public safety, augmented reality or extended reality applications, and so on. The single BWP for sidelink may be associated with a relatively wide operation band, such as a 2 GHz operation band. Further, the single BWP for sidelink may be associated with FR1, FR2, or millimeter wave frequencies.

Figure 3:
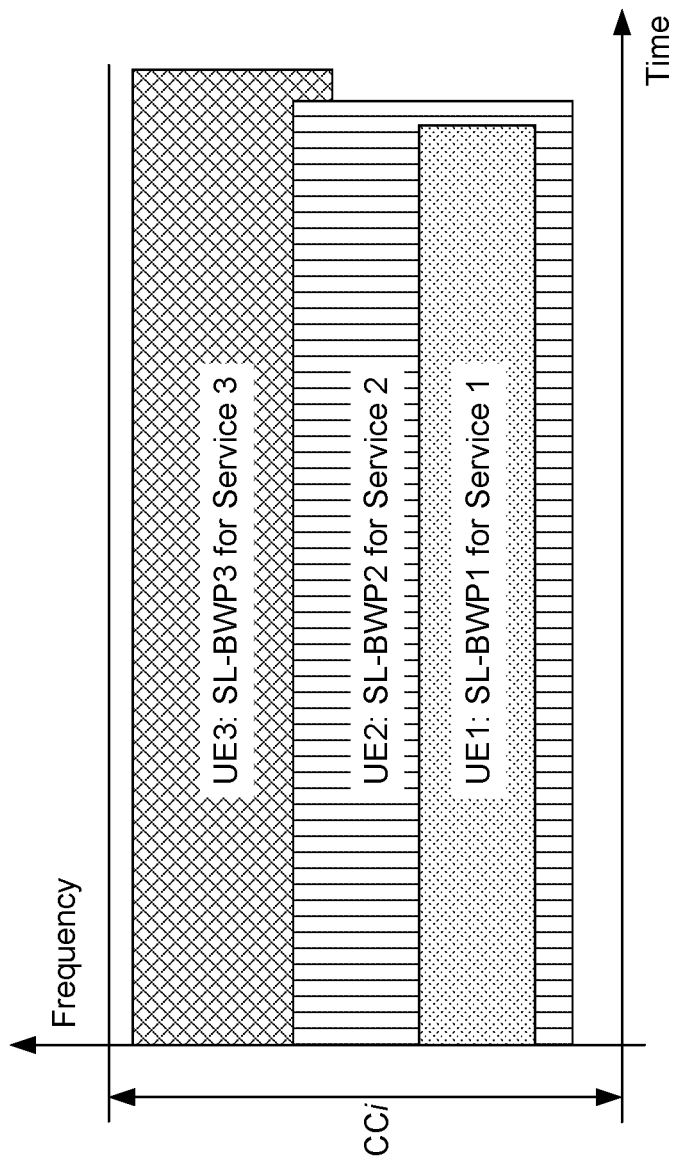
FIG. 3 is a diagram illustrating an example of overlapping and partially overlapping sidelink bandwidth parts (BWPs) among different UEs, in accordance with the present disclosure.

FIG. 3 is a diagram illustrating an example 300 of overlapping and partially overlapping sidelink BWPs among different UEs, in accordance with the present disclosure.

Sidelink BWPs may be fully overlapped or partially overlapped among different UEs with different services (e.g., different groupcasts or broadcasts) or different UE pairs (e.g., different unicasts). The different UEs may include a first UE (UE1), a second UE (UE2), and a third UE (UE3). The first UE may operate with a first sidelink BWP (SL-BWP1) for a first service. The second UE may operate with a second sidelink BWP (SL-BWP2) for a second service. The third UE may operate with a third sidelink BWP (SL-BWP1) for a third service. The first sidelink BWP, the second sidelink BWP, and the third sidelink BWP may be within a component carrier. In this example, the first sidelink BWP associated with the first UE may fully overlap with the second sidelink BWP associated with the second UE, and the second sidelink BWP associated with the second UE may partially overlap with the third sidelink BWP associated with the third UE.

Sidelink BWPs may be "partially overlapping" when a frequency range associated with a first sidelink BWP partially overlaps with a frequency range associated with a second sidelink BWP. Sidelink BWPs may be "fully overlapping" when a frequency range associated with a first sidelink BWP is completely contained within a frequency range associated with a second sidelink BWP.

With respect to the fully overlapped sidelink BWPs between the first UE and the second UE, the first UE may transmit scheduling sidelink control information (SCI) on the first sidelink BWP. The second UE may detect (e.g., always detect) the scheduling SCI transmitted by the first UE for purposes of sensing for resource selection, since the second sidelink BWP is relatively wide as compared to the first sidelink BWP. In other words, since the second sidelink BWP fully overlaps the first sidelink BWP, the second UE may detect the scheduling SCI transmitted by the first UE in the first sidelink BWP. The second UE may detect the first UE's scheduling SCIs within its relatively wide sidelink BWP (e.g., the second sidelink BWP associated with the second service).

Further, the second UE may transmit scheduling SCI on the second sidelink BWP. However, the first UE may not always detect the scheduling SCI transmitted by the second UE, since the first sidelink BWP is relatively narrow as compared to the second sidelink BWP. In other words, since the first sidelink BWP only overlaps with a certain region of the second sidelink BWP, the first UE may not always detect the scheduling SCI transmitted by the second UE in the second sidelink BWP. The first UE cannot always detect the second UE's scheduling SCIs within its narrow sidelink BWP (e.g., the first sidelink BWP associated with the first service).

In some cases, when the first UE does not detect the scheduling SCI transmitted by the second UE, the first UE may be unaware of a sidelink transmission scheduled by the second UE. The first UE may unknowingly schedule a sidelink transmission that conflicts with the sidelink transmission scheduled by the second UE, and such conflicts may degrade a performance of the first UE and/or the second UE.

With respect to the partially overlapped sidelink BWPs between the second UE and the third UE, the second UE may transmit scheduling SCI on the second sidelink BWP. The third UE may transmit scheduling SCI on the third sidelink BWP. The second UE may not detect the scheduling SCI transmitted by the third UE within the third sidelink BWP, based at least in part on a partial overlapping between the second sidelink BWP and the third sidelink BWP. The third UE may not detect the scheduling SCI transmitted by the second UE within the second sidelink BWP, based at least in part on a partial overlapping between the second sidelink BWP and the third sidelink BWP. In other words, both the second UE and the third UE may not always detect another UE's scheduling SCIs within its own sidelink BWP, due to the partially overlapping sidelink BWPs.

As indicated above, FIG. 3 is provided as an example. Other examples may differ from what is described with regard to FIG. 3.

Sidelink BWPs may be fully overlapped or partially overlapped among different UEs with different services (e.g., different groupcasts or broadcasts) or different UE pairs (e.g., different unicasts). The sidelink BWPs that are fully or partially overlapped may result in a mis-detection of resources reserved by other UEs within different sidelink BWPs for different resources. For example, certain UEs may be unable to detect scheduling SCIs transmitted by other UEs, based at least in part on the fully or partially overlapped sidelink BWPs. In these cases, UEs may schedule sidelink transmissions that conflict with previously scheduled transmissions, resulting in a loss of performance among the UEs.

In various aspects of techniques and apparatuses described herein, a UE may receive, from a base station or another UE, a sidelink BWP configuration. The UE may detect active sidelink BWPs on a component carrier based at least in part on the sidelink BWP configuration. In some aspects, the sidelink BWP configuration may indicate a detection gap, and the UE may detect the active sidelink BWPs on the component carrier based at least in part on periodic measurements during the detection gap. In some aspects, the UE may detect the active sidelink BWPs on the component carrier based at least in part on decoded scheduling SCIs from other UEs within other active sidelink BWPs during the detection gap. The UE may detect the active sidelink BWPs on the component carrier, while not mis-detecting resources reserved by the other UEs within different sidelink BWPs for different services. As a result, the UE may not miss scheduling SCIs transmitted by other UEs, and the UE may not reserve resources and perform transmissions on the resource that conflict with transmissions performed by the other UEs.

In some aspects, the UE may perform a sidelink BWP detection when different UEs are configured with different sidelink BWPs. The different sidelink BWPs may be formed for different services or communications (e.g., broadcasts, groupcasts, or unicasts) on a sidelink carrier. The UE operating in a sidelink BWP for a service or communication may need to detect whether its sidelink BWP is overlapping with other sidelink BWPs to avoid possible mis-detection of scheduling SCIs from the other UEs operating with other active sidelink BWPs.

The UE may detect the active sidelink BWPs of the other UEs on the component carrier, while avoiding a mis-detection of resources reserved by the other UEs within the different sidelink BWPs for the different services. The UE may detect the active sidelink BWPs of other UEs via a sensing of sidelink BWPs. The UE may detect the active sidelink BWPs of other UEs based at least in part on sidelink reference signal received power (SL RSRP) measurements and/or decoded scheduling SCIs from the other UEs within other active sidelink BWPs.

In some aspects, the UE may perform the sidelink RSRP measurements periodically based at least in part on configured detection gaps. The configured detection gaps (or measurement gaps) may be gaps dedicated for performing sidelink RSRP measurements. The sidelink RSRP measurements may indicate the active sidelink BWPs on the component carrier. Alternatively, the UE may monitor an SL RSRP of a sidelink BWP associated with the UE. When the UE detects that its sidelink BWP is associated with a sidelink RSRP measurement that satisfies a threshold, the UE may detect that its sidelink BWP is being used by another UE. In other words, the sidelink RSRP measurement satisfying the threshold may trigger the UE to detect other UEs' active sidelink BWPs.

In some aspects, the UE may detect the active sidelink BWPs of other UEs by decoding the scheduling SCIs from the other UEs within the other active sidelink BWPs. The UE may decode the scheduling SCIs from the other UEs during the configured detection gaps, which may indicate that certain sidelink BWPs are active sidelink BWPs on the component carrier. Alternatively, the UE may decode the scheduling SCIs from the other UEs based at least in part on a random sensing of other sidelink BWPs, which may enable the UE to detect the active sidelink BWPs of the other UEs.

In some aspects, a UE may detect the active sidelink BWPs, which may involve a wideband active sidelink BWP detection or a narrowband active sidelink BWP detection. With respect to the wideband active sidelink BWP detection, a UE with a relatively wide active sidelink BWP may detect other active sidelink BWPs with its active sidelink BWP randomly shifted in a frequency operation range of the component carrier. With respect to the narrowband active sidelink BWP detection, a UE with a relatively narrow active sidelink BWP may detect other active sidelink BWPs with its active sidelink BWP randomly shifted on an SCI scheduling grid in the frequency operation range of the component carrier. The SCI scheduling grid may be configured per a minimum bandwidth of sidelink BWPs on the component carrier. Scheduling SCI may be duplicated on each SCI scheduling grid. In other words, the UE may detect the other active sidelink BWPs based at least in part on the SCI scheduling grid and repetitions of the scheduling SCI across the SCI scheduling grid.

Figure 4:
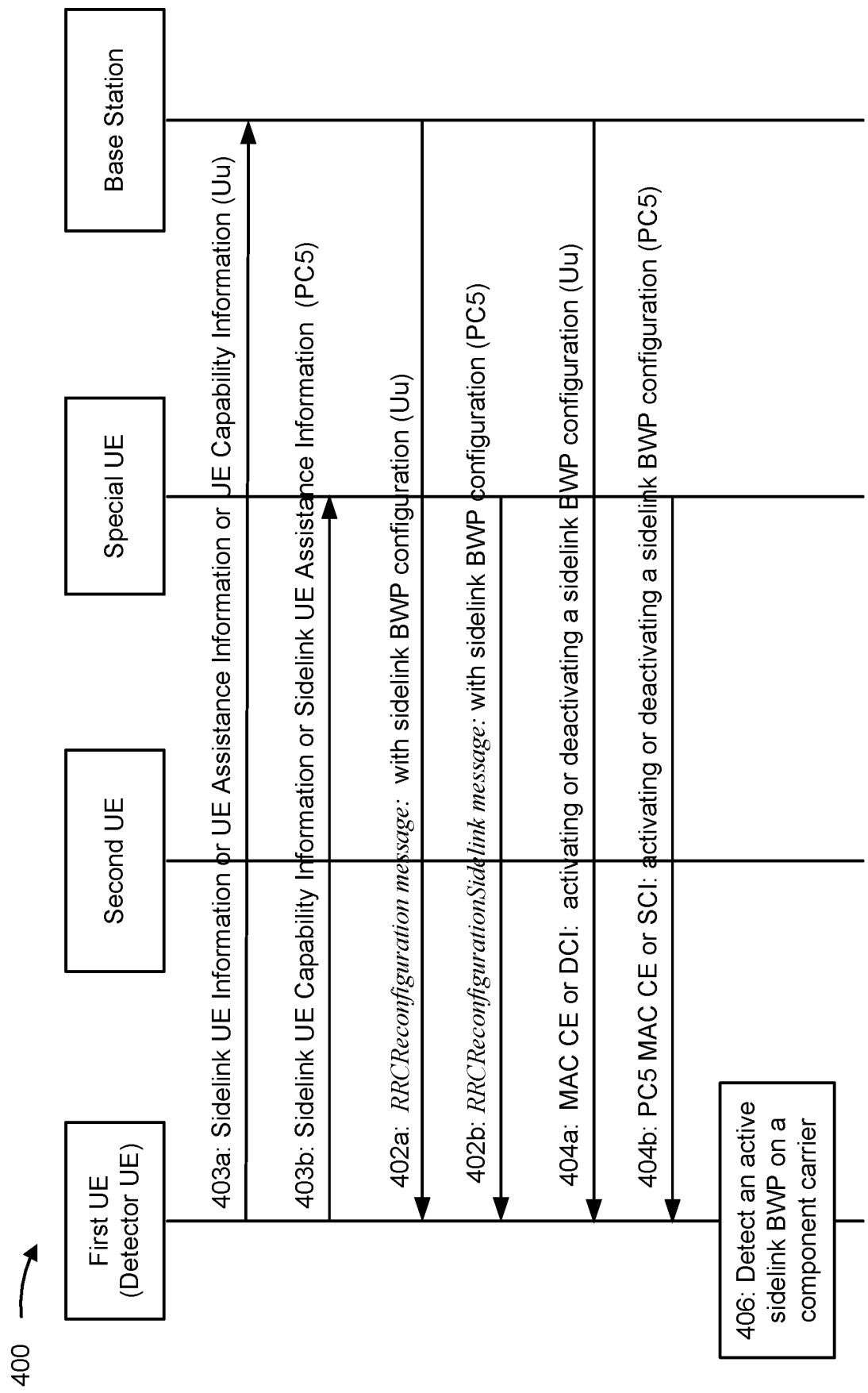
FIG. 4 is a diagram illustrating an example associated with detecting active sidelink BWPs on component carriers, in accordance with the present disclosure.

FIG. 4 is a diagram illustrating an example 400 associated with detecting active sidelink BWPs on component carriers, in accordance with the present disclosure. As shown in FIG. 4, example 400 includes communication between a first UE (e.g., UE 120*a*), a second UE (e.g., UE 120*e*), and/or a base station (e.g., base station 110). In some aspects, the first UE, the second UE, and/or the base station may be included in a wireless network, such as wireless network 100.

As shown by reference number 402*a* and 402*b*, the UE may receive a sidelink BWP configuration via a radio resource control (RRC) configuration message. In some aspects, the sidelink BWP configuration may indicate one or multiple sidelink BWPs which may include a default sidelink BWP and/or an active sidelink BWP. In some aspects, the sidelink BWP configuration may indicate a detection gap for active sidelink BWP detection. In some aspects, the sidelink BWP configuration may indicate a measurement threshold for the active sidelink BWP detection. In some aspects, the sidelink BWP configuration may indicate an SCI scheduling grid for the active sidelink BWP detection.

In some aspects, the UE may receive the sidelink BWP configuration from a base station (as shown by reference number 402a), where the sidelink BWP configuration may be based at least in part on a sidelink UE information message, a UE assistance information message, or a UE capability information message. The base station may determine the sidelink BWP configuration based at least in part on the sidelink UE information message, the UE assistance information message, or the UE capability information message received at the base station. The base station may determine the sidelink BWP configuration based at least in part on an input (e.g., one or more suitable SL BWP configurations, sidelink quality of service (QoS), or a measurement report related to a sidelink BWP or the UE's capability related to the sidelink BWP) received from the UE (e.g., the sidelink UE information message, the UE assistance information message, or the UE capability information message, as shown by reference number 403a), and the base station may transmit the sidelink BWP configuration (e.g., via RRCReconfiguration message at Uu interface) to the UE via a Uu interface.

In some aspects, the UE may receive the sidelink BWP configuration from a special UE (as shown by reference number 402b), where the sidelink BWP configuration may be based at least in part on a sidelink UE assistance information message or a sidelink UE capability information message. The special UE may determine the sidelink BWP configuration based at least in part on the sidelink UE assistance information message or the sidelink UE capability information message received at the special UE. The special UE may determine the sidelink BWP configuration based at least in part on an input (e.g., one or more suitable sidelink BWP configurations, sidelink QoS, or a measurement report related to a sidelink BWP or the UE's capability related to the sidelink BWP) received from the UE (e.g., the sidelink UE assistance information message or the sidelink UE capability information message, as shown by reference number 403b), and the special UE may transmit the sidelink BWP configuration (e.g., via RRCReconfigurationSidelink message at PC5 interface) to the UE. The special UE may be a roadside unit (RSU), a group lead, a cluster head, or a scheduling UE.

In some aspects, the UE may further receive a sidelink BWP configuration activation or deactivation via a medium access control element (MAC-CE). The UE may receive a MAC-CE from the base station, as shown by reference number 404a, or the UE may receive a PC5 MAC CE from the special UE, as shown by reference number 404b. In some aspects, the activation or deactivation may indicate one or multiple sidelink BWPs. In some aspects, the activation or deactivation may indicate a detection gap for active sidelink BWP detection. In some aspects, the activation or deactivation may indicate a measurement threshold for the active sidelink BWP detection. In some aspects, the activation or deactivation may indicate an SCI scheduling grid for the active sidelink BWP detection.

As shown by reference number 406, the UE may detect an active sidelink BWP within or outside the UE's active sidelink BWP on a component carrier based at least in part on the sidelink BWP configuration. The UE may detect the active sidelink BWP from a plurality of fully overlapped sidelink BWPs and/or a plurality of partially overlapped sidelink BWPs among different UEs with different services or different UE pairs. The UE may be a detector UE.

In some aspects, the UE may detect the active sidelink BWP on the component carrier based at least in part on periodic measurements during the detection gap. The periodic measurements may be sidelink RSRP measurements. In some aspects, the UE may detect the active sidelink BWP on the component carrier based at least in part on a measurement (e.g., sidelink RSRP measurement of a DMRS of a physical sidelink control channel (PSCCH) and/or a physical sidelink shared channel (PSSCH), within or outside the UE's active SL BWP) that satisfies a configured measurement threshold. In some aspects, the active sidelink BWP detection may be based at least in part on sidelink RSRP measurements, which may be periodic measurements within or outside the UE's active sidelink BWP based at least in part on the configured detection gap, or which may be triggered (e.g., when a sidelink RSRP within the UE's active SL BWP is above a configured measurement threshold) when outside the configured detection gap.

In some aspects, the UE may detect an active sidelink BWP on the component carrier based at least in part on decoded scheduling SCIs from other UEs within or outside the UE's active sidelink BWP during the detection gap or within the UE's active sidelink BWP when outside the detection gap. In some aspects, the sidelink BWP configuration may indicate other sidelink BWPs, and the UE may detect the active sidelink BWP on the component carrier based at least in part on the decoded scheduling SCIs from the other UEs in accordance with a random sensing of the other sidelink BWPs. In some aspects, the active sidelink BWP detection may be based at least in part on the UE decoding the scheduling SCIs from the other UEs within or outside the UE's active sidelink BWP, which may occur based at least in part on a random sensing during the configured detection gap, or the active sidelink BWP detection may be based at least in part on the UE decoding the scheduling SCIs from the other UEs within the UE's active sidelink BWP, which may occur based at least in part on a full or partial sensing outside the configured detection gap.

In some aspects, the UE may detect the active sidelink BWP on the component carrier based at least in part on a random shifting of a wide active sidelink BWP associated with the UE in a frequency operation range of the component carrier. In some aspects, during a wideband active sidelink BWP detection, the UE with the relatively wide active BWP may detect the other active sidelink BWPs with the relatively wide active BWP associated with the UE randomly shifted in the frequency operation range of the component carrier during the configured detection gap.

In some aspects, the UE may detect the active sidelink BWP on the component carrier based at least in part on a random shifting of a narrow active sidelink BWP associated with the UE on an SCI scheduling grid in the frequency operation range of the component carrier. The SCI scheduling grid may be configured per a minimum bandwidth of all sidelink BWPs or a common factor in frequency of all sidelink BWPs on the component carrier. A scheduling SCI may be duplicated on each SCI scheduling grid. In some aspects, the UE may decode, from other UEs including the second UE, the scheduling SCI that is duplicated on the SCI scheduling grid. In other words, the other UEs may duplicate the scheduling SCI on the SCI scheduling grid, and the other UEs may transmit scheduling SCIs duplicated on the SCI scheduling grid. In some aspects, during a narrowband active sidelink BWP detection, the UE with the relatively narrow active sidelink BWP may detect the other active sidelink BWPs with the relatively narrow active sidelink BWP associated with the UE randomly shifted on the SCI scheduling grid in the frequency operation range of the component carrier during the configured detection gap.

As indicated above, FIG. 4 is provided as an example. Other examples may differ from what is described with regard to FIG. 4.

Figure 5:
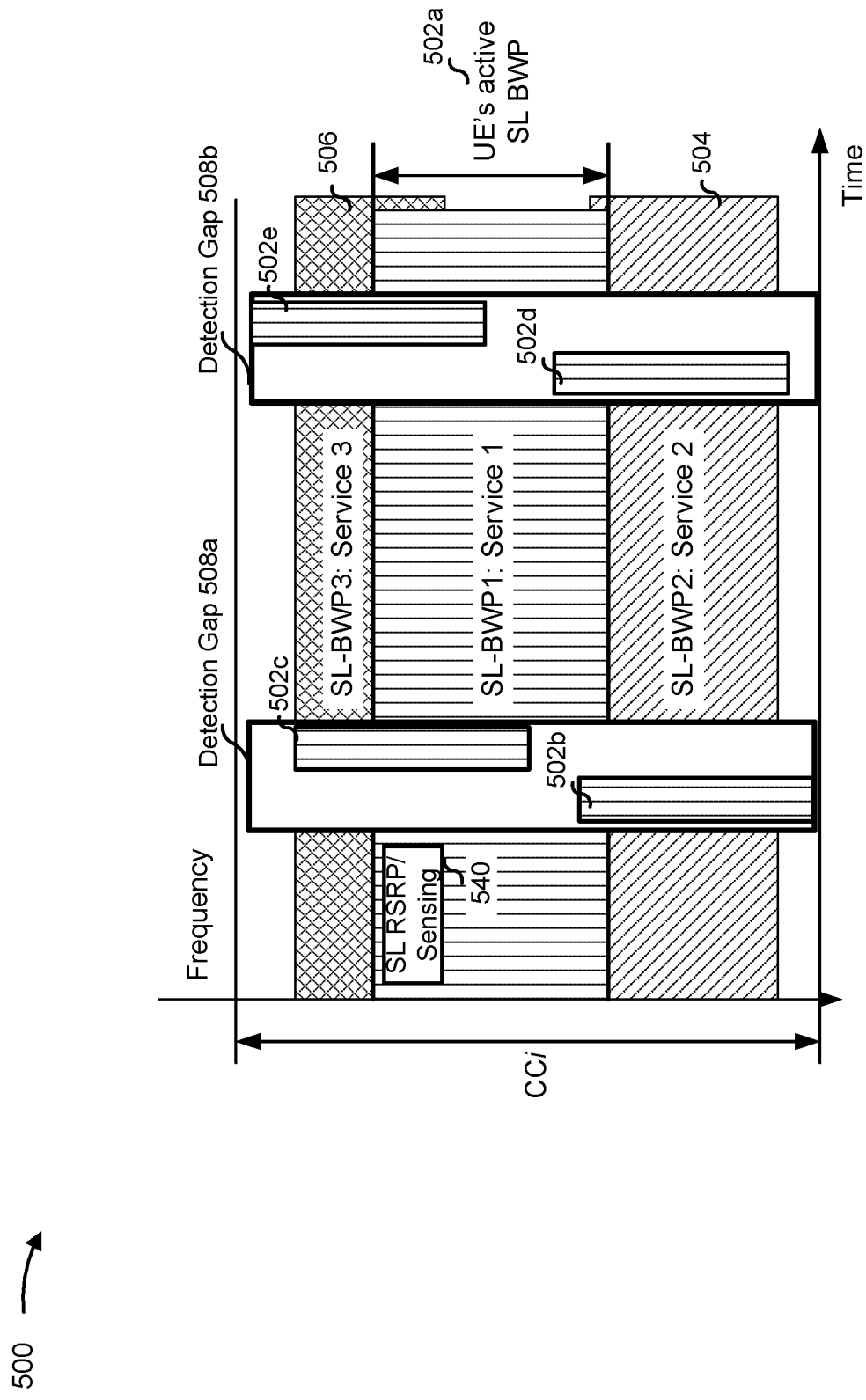
FIG. 5 is a diagram illustrating an example associated with a wideband sidelink BWP detection, in accordance with the present disclosure.

FIG. 5 is a diagram illustrating an example 500 associated with a wideband sidelink BWP detection, in accordance with the present disclosure.

In some aspects, a first UE may operate with a first active sidelink BWP (as shown by reference number 502a) for a first service. A second UE may operate with a second active sidelink BWP (as shown by reference number 504) for a second service. A third UE may operate with a third active sidelink BWP (as shown by reference number 506) for a third service. In this example, the first active sidelink BWP associated with the first UE may partially overlap with the second active sidelink BWP associated with the second UE, and the first sidelink BWP associated with the first UE may partially overlap with the third active sidelink BWP associated with the third UE. The first active sidelink BWP, the second active sidelink BWP, and the third active sidelink BWP may be within a component carrier.

In some aspects, during the wideband sidelink BWP detection, the first UE, with a relatively wide active sidelink BWP (e.g., the first active sidelink BWP), may detect other active sidelink BWPs (e.g., the second active sidelink BWP and/or the third active sidelink BWP) by randomly shifting its active sidelink BWP (as shown by reference number 502b, 502c or reference number 502d, 502e) in a detection gap configured (as shown by reference number 508a, 508b). The first UE may randomly shift its active sidelink BWP in a frequency operation range of the component carrier. The first UE may detect other active sidelink BWPs (e.g., the second active sidelink BWP 504 and/or the third active sidelink BWP 506) by randomly shifting its active sidelink BWP (e.g., active sidelink BWP 502b, 502c in detection gap 508a or active sidelink BWP 502d, 502e in detection gap 508b associated with the first UE) in the frequency operation range of the component carrier.

In some aspects, during the wideband sidelink BWP detection, the first UE may detect the other active sidelink BWPs based at least in part on the random shifting of its active sidelink BWP and sidelink RSRP measurements. The UE may perform the sidelink RSRP measurements while its sidelink BWP is randomly shifted in the frequency operation range of the component carrier. The UE may perform the sidelink RSRP measurements periodically based at least in part on configured detection gaps (or measurement gaps), which may be dedicated gaps that allow the UE to perform the sidelink RSRP measurements. In other words, the UE may randomly shift its sidelink BWP and perform the sidelink RSRP measurements in accordance with the configured detection gaps (as shown by reference number 508a, 508b). The sidelink RSRP measurements (e.g., the sidelink RSRP measurements of a DMRS of a PSCCH and/or a PSSCH) may indicate the other active sidelink BWPs on the component carrier if the sidelink measurements are above a threshold configured with the sidelink BWP configuration.

In some aspects, during the wideband sidelink BWP detection, the first UE may detect the other active sidelink BWPs based at least in part on the random shifting of its active sidelink BWP and decoded scheduling SCIs from other UEs (e.g., the second UE and the third UE) within the other active sidelink BWPs (e.g., the second active sidelink BWP and the third active sidelink BWP). The UE may decode the scheduling SCIs from the other UEs while its active sidelink BWP is randomly shifted in the frequency operation range of the component carrier. The UE may decode the scheduling SCIs from the other UEs during the configured detection gaps, which may indicate that certain sidelink BWPs are active sidelink BWPs on the component carrier. In other words, the UE may randomly shift its active sidelink BWP and decode the scheduling SCIs from the other UEs during the configured detection gaps (as shown by reference number 508a, 508b). The decoded scheduling SCIs may indicate the other active sidelink BWPs (e.g., active sidelink BWP 504 and/or 506) on the component carrier. Alternatively, the UE may randomly shift its active sidelink BWP and decode the scheduling SCIs from the other UEs in accordance with a random sensing or partial sensing of other sidelink BWPs, which may enable the first UE to detect the active sidelink BWPs of the other UEs.

In some aspects, the first UE may detect the other active sidelink BWPs (e.g., the third active sidelink BWP 506) based at least in part on the sidelink RSRP measurement (e.g., if the sidelink RSRP measurement at 540 is above a configured threshold) and/or decoded scheduling SCIs from other UEs (e.g., via full or partial sensing at 540) within its active sidelink BWP (e.g., the active sidelink BWP 502a) and outside the detection gap configured (e.g., detection gap 508a, 508b).

In some aspects, the first UE may trigger a wideband sidelink BWP detection based at least in part on the sidelink RSRP measurement (e.g., if the sidelink RSRP measurement at 540 is above a configured threshold) and/or decoded scheduling SCIs from other UEs (e.g., via full or partial sensing at 540) within its active sidelink BWP (e.g., the active sidelink BWP 502a) and outside the detection gap configured (e.g., detection gap 508a, 508b).

As indicated above, FIG. 5 is provided as an example. Other examples may differ from what is described with regard to FIG. 5.

Figure 6:
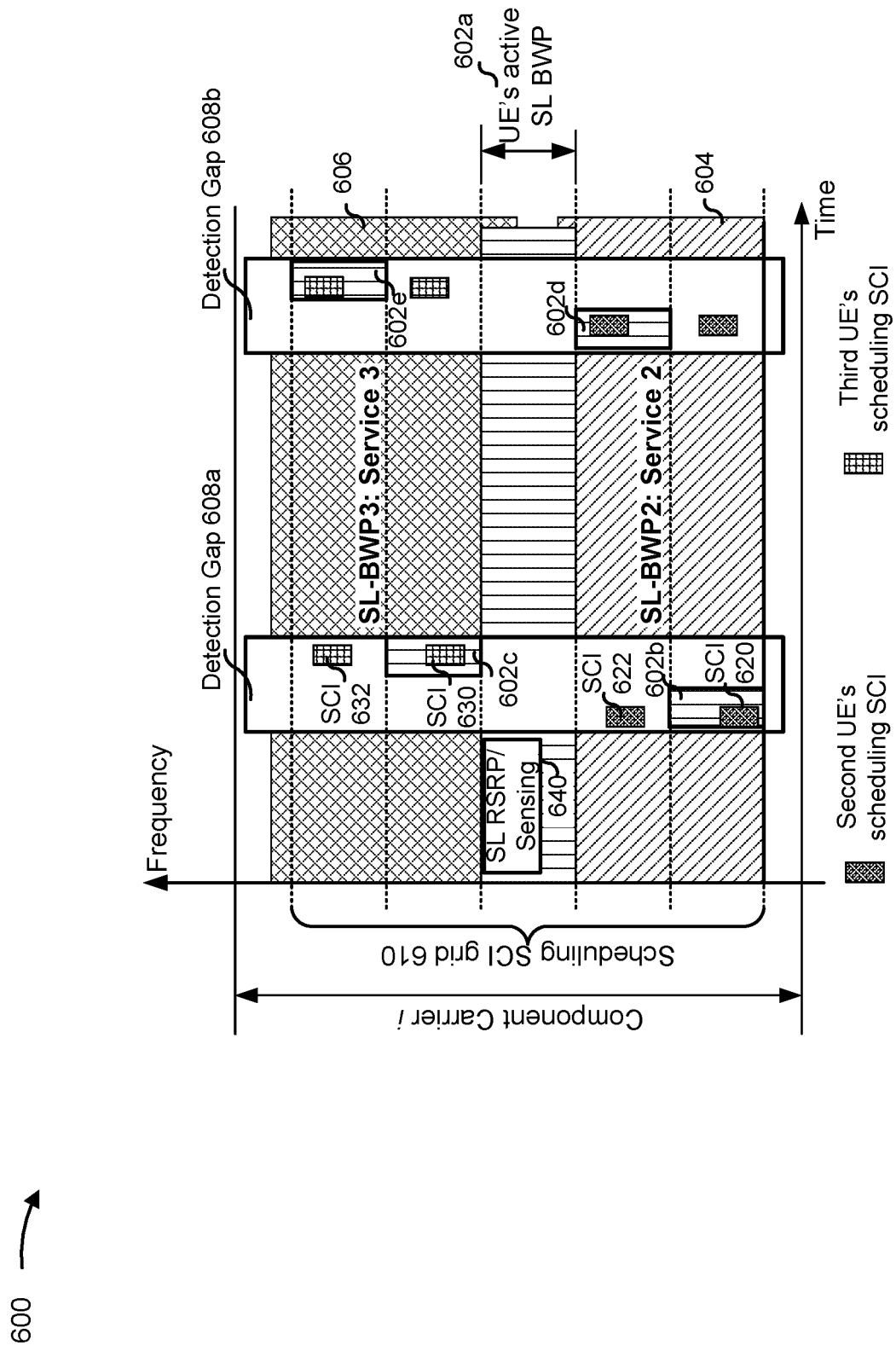
FIG. 6 is a diagram illustrating an example associated with a narrowband sidelink BWP detection, in accordance with the present disclosure.

FIG. 6 is a diagram illustrating an example 600 associated with a narrowband sidelink BWP detection, in accordance with the present disclosure.

In some aspects, a first UE may operate with a first active sidelink BWP (as shown by reference number 602a) for a first service. A second UE may operate with a second active sidelink BWP (as shown by reference number 604) for a second service. A third UE may operate with a third active sidelink BWP (as shown by reference number 606) for a third service. In this example, the first active sidelink BWP associated with the first UE may partially overlap with the second active sidelink BWP associated with the second UE, and the first active sidelink BWP associated with the first UE may partially overlap with the third active sidelink BWP associated with the third UE. The first active sidelink BWP, the second active sidelink BWP, and the third active sidelink BWP may be within a component carrier.

In some aspects, for narrowband sidelink BWP detection, the first UE, with a relatively narrow active sidelink BWP (e.g., the first active sidelink BWP), may detect other active sidelink BWPs (e.g., the second active sidelink BWP and/or the third active sidelink BWP) by randomly shifting its active sidelink BWP (as shown by reference number 602b, 602c or reference number 602d, 602e) in a detection gap configured (as shown by reference number 608a, 708b). The first UE may randomly shift its active sidelink BWP on an SCI scheduling grid (as shown by reference number 610) in a frequency operation range of the component carrier. The first UE may detect other active sidelink BWPs (e.g., the second active sidelink BWP 604 and/or the third active sidelink BWP 606) by randomly shifting its active sidelink BWP (e.g., active sidelink BWP 602*b*, 602*c* in detection gap 608*a* or active sidelink BWP 602*d*, 602*e* in detection gap 608*b* associated with the first UE) on the SCI scheduling grid in the frequency operation range of the component carrier. Due to the relatively narrow active sidelink BWP associated with the first UE, the SCI scheduling grid may allow the first UE to detect the other active sidelink BWPs more quickly, as the first UE does not need to scan every channel of the component carrier.

In some aspects, the SCI scheduling grid may be configured per a minimum bandwidth of all sidelink BWPs on the component carrier (e.g., the first active sidelink BWP 602*a*) or a common factor in frequency of all sidelink BWPs on the component carrier. The scheduling SCI may be duplicated on each SCI scheduling grid (e.g., SCI 620 and SCI 622 in the second active sidelink BWP 604 or SCI 630 and SCI 632 in the third active sidelink BWP 606). In other words, the UE may detect the other active sidelink BWPs based at least in part on the SCI scheduling grid and repetitions of the scheduling SCI across the SCI scheduling grid.

For example, SCI 620 and SCI 622 may be duplicated for the second active sidelink BWP 604, which may be a relatively wide active sidelink BWP as compared to the first active sidelink BWP 602*a*. Further, SCI 630 and SCI 632 may be duplicated for the third active sidelink BWP 606, which may be a relatively wide active sidelink BWP as compared to the first active sidelink BWP 602*a*.

In some aspects, for narrowband sidelink BWP detection, the first UE may detect the other active sidelink BWPs based at least in part on the random shifting of its active sidelink BWP on the SCI scheduling grid and decoded scheduling SCIs from other UEs (e.g., the second UE and the third UE) within the other active sidelink BWPs (e.g., the second active sidelink BWP and the third active sidelink BWP). The UE may decode the scheduling SCIs from the other UEs while its active sidelink BWP is randomly shifted on the SCI scheduling grid in the frequency operation range of the component carrier. The UE may decode the scheduling SCIs from the other UEs during the configured detection gaps, which may indicate that certain sidelink BWPs are active sidelink BWPs on the component carrier. In other words, the UE may randomly shift its active sidelink BWP on the SCI scheduling grid and decode the scheduling SCIs from the other UEs during the configured detection gaps (e.g., detection gap 608*a*, 608*b*). The decoded scheduling SCIs may indicate the other active sidelink BWPs on the component carrier.

In some aspects, during the narrowband sidelink BWP detection, the first UE may detect the other active sidelink BWPs based at least in part on the random shifting of its active sidelink BWP and sidelink RSRP measurements. The UE may perform the sidelink RSRP measurements while its active sidelink BWP is randomly shifted in the frequency operation range of the component carrier. The UE may perform the sidelink RSRP measurements periodically based at least in part on configured detection gaps (or measurement gaps), which may be dedicated gaps that allow the UE to perform the sidelink RSRP measurements. In other words, during the narrowband sidelink BWP detection, the UE may randomly shift its active sidelink BWP and perform the sidelink RSRP measurements in accordance with the configured detection gaps (as shown by reference number 608*a*, 608*b*). The sidelink RSRP measurements (e.g., the sidelink RSRP measurements of a DMRS of a PSCCH and/or a PSSCH) may indicate the other active sidelink BWPs on the component carrier if the sidelink measurements are above a threshold configured with the sidelink BWP configuration.

In some aspects, the first UE may detect the other active sidelink BWPs (e.g., the third active sidelink BWP 606) based at least in part on the sidelink RSRP measurement (e.g., if the sidelink RSRP measurement at 640 is above a configured threshold) and/or decoded scheduling SCIs from other UEs (e.g., via full or partial sensing at 640) within its active sidelink BWP (e.g., the active sidelink BWP 602*a*) and outside the configured detection gap (e.g., detection gap 608*a*, 608*b*).

In some aspects, the first UE may trigger a narrowband sidelink BWP detection based at least in part on the sidelink RSRP measurement (e.g., if the sidelink RSRP measurement at 640 is above a configured threshold) and/or decoded scheduling SCIs from other UEs (e.g., via full or partial sensing at 640) within its active sidelink BWP (e.g., the active sidelink BWP 602*a*)) and outside the configured detection gap (e.g., detection gap 608*a*, 608*b*).

As indicated above, FIG. 6 is provided as an example. Other examples may differ from what is described with regard to FIG. 6.

Figure 7:
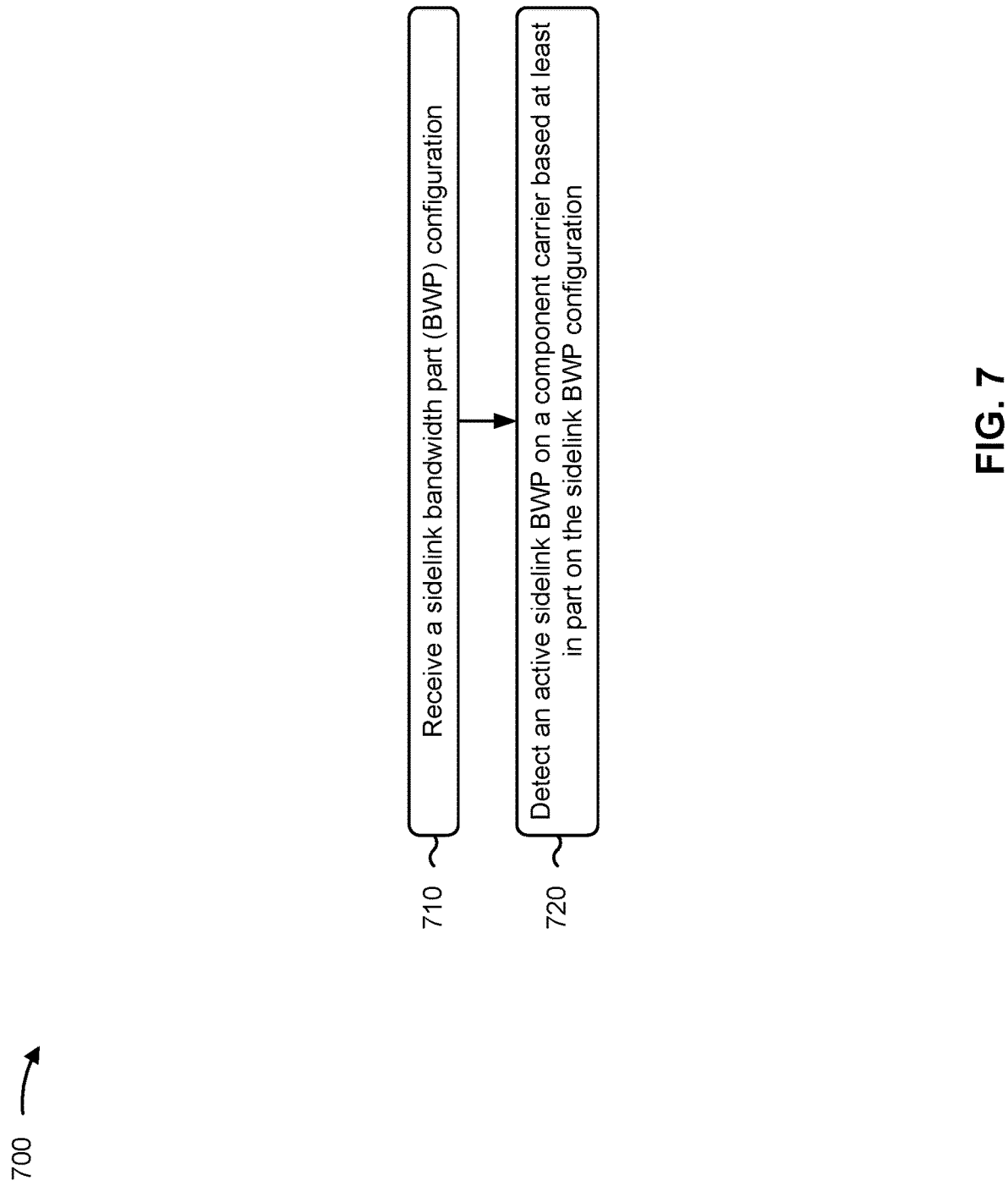
FIG. 7 is a diagram illustrating an example process associated with detecting active sidelink BWPs, in accordance with the present disclosure.

FIG. 7 is a diagram illustrating an example process 700 performed, for example, by a UE, in accordance with the present disclosure. Example process 700 is an example where the UE (e.g., UE 120) performs operations associated with detecting active sidelink BWPs on component carriers.

As shown in FIG. 7, in some aspects, process 700 may include receiving a sidelink BWP configuration (block 710). For example, the UE (e.g., using communication manager 140 and/or reception component 802, depicted in FIG. 8) may receive a sidelink BWP configuration, as described above.

As further shown in FIG. 7, in some aspects, process 700 may include detecting an active sidelink BWP on a component carrier based at least in part on the sidelink BWP configuration (block 720). For example, the UE (e.g., using communication manager 140 and/or detection component 808, depicted in FIG. 8) may detect an active sidelink BWP on a component carrier based at least in part on the sidelink BWP configuration, as described above.

Process 700 may include additional aspects, such as any single aspect or any combination of aspects described below and/or in connection with one or more other processes described elsewhere herein.

In a first aspect, process 700 includes receiving the sidelink BWP configuration from a base station, wherein the sidelink BWP configuration is based at least in part on a sidelink UE information message.

In a second aspect, alone or in combination with the first aspect, process 700 includes receiving the sidelink BWP configuration from a special UE, wherein the sidelink BWP configuration is based at least in part on a sidelink UE assistance information message.

In a third aspect, alone or in combination with one or more of the first and second aspects, the sidelink BWP configuration indicates a detection gap, and detecting the active sidelink BWP on the component carrier is based at least in part on periodic measurements during the detection gap.

In a fourth aspect, alone or in combination with one or more of the first through third aspects, the sidelink BWP configuration indicates a measurement threshold, and detecting the active sidelink BWP on the component carrier is based at least in part on a measurement that satisfies the measurement threshold.

In a fifth aspect, alone or in combination with one or more of the first through fourth aspects, the sidelink BWP configuration indicates a detection gap, and detecting the active sidelink BWP on the component carrier is based at least in part on decoded scheduling SCIs from other UEs within other active sidelink BWPs during the detection gap.

In a sixth aspect, alone or in combination with one or more of the first through fifth aspects, the sidelink BWP configuration indicates other sidelink BWPs, and detecting the active sidelink BWP on the component carrier is based at least in part on decoded scheduling SCIs from other UEs within other active sidelink BWPs in accordance with a random sensing of the other sidelink BWPs.

In a seventh aspect, alone or in combination with one or more of the first through sixth aspects, detecting the active sidelink BWP on the component carrier is based at least in part on randomly shifting a wide active sidelink BWP associated with the UE in a frequency operation range of the component carrier.

In an eighth aspect, alone or in combination with one or more of the first through seventh aspects, detecting the active sidelink BWP on the component carrier is based at least in part on randomly shifting a narrow active sidelink BWP associated with the UE on a SCI scheduling grid in a frequency operation range of the component carrier, wherein the SCI scheduling grid is configured per a minimum bandwidth of sidelink BWPs on the component carrier, and a scheduling SCI is duplicated on each SCI scheduling grid.

In a ninth aspect, alone or in combination with one or more of the first through eighth aspects, process 700 includes decoding, from other UEs, the scheduling SCI that is duplicated on the SCI scheduling grid.

In a tenth aspect, alone or in combination with one or more of the first through ninth aspects, process 700 includes detecting the active sidelink BWP from one or more of a plurality of fully overlapped sidelink BWPs or a plurality of partially overlapped sidelink BWPs among different UEs with different services or different UE pairs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
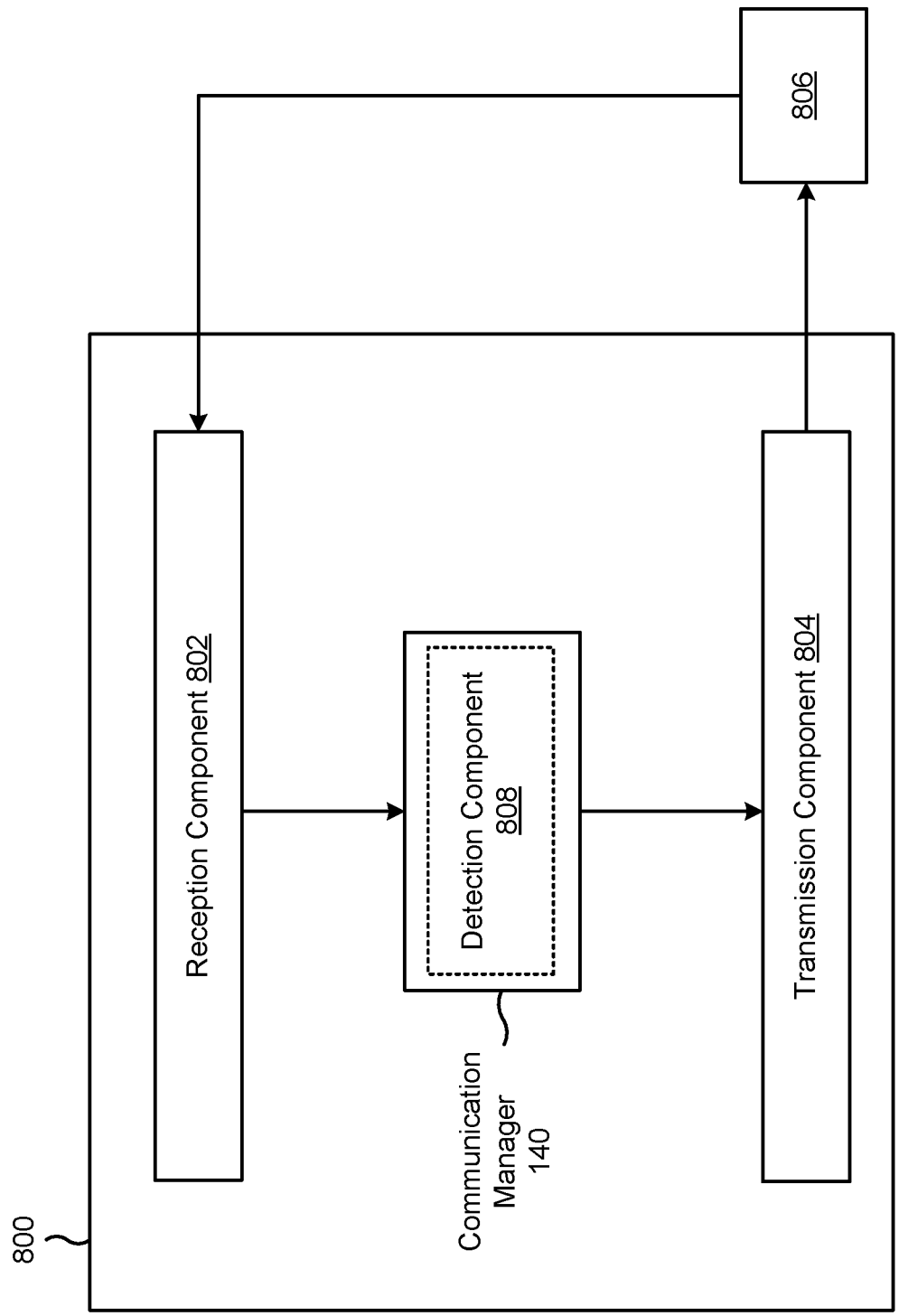
FIG. 8 is a diagram of an example apparatus for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a detection component 808, among other examples.

In some aspects, the apparatus 800 may be configured to perform one or more operations described herein in connection with FIGS. 4-6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a sidelink BWP configuration. The detection component 808 may detect an active sidelink BWP on a component carrier based at least in part on the sidelink BWP configuration. The reception component 802 may decode, from other UEs, a scheduling SCI that is duplicated on an SCI scheduling grid.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a sidelink bandwidth part (BWP) configuration; and detecting an active sidelink BWP on a component carrier based at least in part on the sidelink BWP configuration.

Aspect 2: The method of Aspect 1, wherein receiving the sidelink BWP configuration comprises receiving the sidelink BWP configuration from a base station, wherein the sidelink BWP configuration is based at least in part on a sidelink UE information message.

Aspect 3: The method of any of Aspects 1 through 2, wherein receiving the sidelink BWP configuration comprises receiving the sidelink BWP configuration from a special UE, wherein the sidelink BWP configuration is based at least in part on a sidelink UE assistance information message.

Aspect 4: The method of any of Aspects 1 through 3, wherein the sidelink BWP configuration indicates a detection gap, and detecting the active sidelink BWP on the component carrier is based at least in part on periodic measurements during the detection gap.

Aspect 5: The method of any of Aspects 1 through 4, wherein the sidelink BWP configuration indicates a measurement threshold, and detecting the active sidelink BWP on the component carrier is based at least in part on a measurement that satisfies the measurement threshold.

Aspect 6: The method of any of Aspects 1 through 5, wherein the sidelink BWP configuration indicates a detection gap, and detecting the active sidelink BWP on the component carrier is based at least in part on decoded scheduling sidelink control informations (SCIs) from other UEs within other active sidelink BWPs during the detection gap.

Aspect 7: The method of any of Aspects 1 through 6, wherein the sidelink BWP configuration indicates other sidelink BWPs, and detecting the active sidelink BWP on the component carrier is based at least in part on decoded scheduling sidelink control informations (SCIs) from other UEs within other active sidelink BWPs in accordance with a random sensing of the other sidelink BWPs.

Aspect 8: The method of any of Aspects 1 through 7, of Aspect 1, wherein detecting the active sidelink BWP on the component carrier is based at least in part on randomly shifting a wideband active sidelink BWP associated with the UE in a frequency operation range of the component carrier.

Aspect 9: The method of any of Aspects 1 through 8, of Aspect 1, wherein detecting the active sidelink BWP on the component carrier is based at least in part on randomly shifting a narrowband active sidelink BWP associated with the UE on a sidelink control information (SCI) scheduling grid in a frequency operation range of the component carrier, wherein the SCI scheduling grid is configured per a minimum bandwidth of sidelink BWPs on the component carrier, and wherein a scheduling SCI is duplicated on each SCI scheduling grid.

Aspect 10: The method of Aspect 9, further comprising: decoding, from other UEs, the scheduling SCI that is duplicated on the SCI scheduling grid.

Aspect 11: The method of any of Aspects 1 through 10, wherein detecting the active sidelink BWP on the component carrier comprises detecting the active sidelink BWP from one or more of: a plurality of fully overlapped sidelink BWPs or a plurality of partially overlapped sidelink BWPs among different UEs with different services or different UE pairs.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive a sidelink bandwidth part (BWP) configuration, wherein the sidelink BWP configuration indicates a detection gap for active sidelink BWP detection; and
      detect an active sidelink BWP on a component carrier based at least in part on:
         periodic measurements during the detection gap, or
         decoded scheduling sidelink control informations (SCIs) from other UEs within other active sidelink BWPs during the detection gap.

2. The apparatus of claim 1, wherein the one or more processors, to receive the sidelink BWP configuration, are configured to receive the sidelink BWP configuration from a network entity, wherein the sidelink BWP configuration is based at least in part on a sidelink UE information message.

3. The apparatus of claim 1, wherein the one or more processors, to receive the sidelink BWP configuration, are configured to receive the sidelink BWP configuration from a special UE, wherein the sidelink BWP configuration is based at least in part on a sidelink UE assistance information message.

4. The apparatus of claim 1, wherein the sidelink BWP configuration indicates a measurement threshold, and the one or more processors, to detect the active sidelink BWP on the component carrier, are configured to detect the active sidelink BWP on the component carrier based at least in part on a measurement that satisfies the measurement threshold.

5. The apparatus of claim 1, wherein the sidelink BWP configuration indicates other sidelink BWPs, and the one or more processors, to detect the active sidelink BWP on the component carrier, are configured to detect the active sidelink BWP on the component carrier based at least in part on the decoded scheduling SCIs in accordance with a random sensing of the other sidelink BWPs.

6. The apparatus of claim 1, wherein the one or more processors, to detect the active sidelink BWP on the component carrier, are configured to detect the active sidelink BWP on the component carrier based at least in part on a random shifting of a wide active sidelink BWP associated with the UE in a frequency operation range of the component carrier.

7. The apparatus of claim 1, wherein the sidelink BWP configuration indicates a SCI scheduling grid, wherein the one or more processors, to detect the active sidelink BWP on the component carrier, are configured to detect the active sidelink BWP on the component carrier based at least in part on a random shifting of a narrow active sidelink BWP associated with the UE on the SCI scheduling grid in a frequency operation range of the component carrier, wherein the SCI scheduling grid is configured per a minimum bandwidth of sidelink BWPs on the component carrier, and wherein a scheduling SCI is duplicated on each SCI scheduling grid.

8. The apparatus of claim 7, wherein the one or more processors are further configured to:
   decode, from other UEs, the scheduling SCI that is duplicated on the SCI scheduling grid.

9. The apparatus of claim 1, wherein the one or more processors, to detect the active sidelink BWP on the component carrier, are configured to detect the active sidelink BWP from one or more of: a plurality of fully overlapped sidelink BWPs or a plurality of partially overlapped sidelink BWPs among different UEs with different services or different UE pairs.

10. A method of wireless communication performed by a user equipment (UE), comprising:
    receiving a sidelink bandwidth part (BWP) configuration, wherein the sidelink BWP configuration indicates a detection gap for active sidelink BWP detection; and
    detecting an active sidelink BWP on a component carrier based at least in part on:
       periodic measurements during the detection gap, or
       decoded scheduling sidelink control informations (SCIs) from other UEs within other active sidelink BWPs during the detection gap.

11. The method of claim 10, wherein receiving the sidelink BWP configuration comprises receiving the sidelink BWP configuration from a network entity, wherein the sidelink BWP configuration is based at least in part on a sidelink UE information message.

12. The method of claim 10, wherein receiving the sidelink BWP configuration comprises receiving the sidelink BWP configuration from a special UE, wherein the sidelink BWP configuration is based at least in part on a sidelink UE assistance information message.

13. The method of claim 10, wherein the sidelink BWP configuration indicates a measurement threshold, and detecting the active sidelink BWP on the component carrier comprises detecting the active sidelink BWP on the component carrier based at least in part on a measurement that satisfies the measurement threshold.

14. The method of claim 10, wherein the sidelink BWP configuration indicates other sidelink BWPs, and detecting the active sidelink BWP on the component carrier comprises detecting the active sidelink BWP on the component carrier based at least in part on the decoded scheduling SCIs in accordance with a random sensing of the other sidelink BWPs.

15. The method of claim 10, wherein detecting the active sidelink BWP on the component carrier comprises detecting the active sidelink BWP on the component carrier based at least in part on randomly shifting a wide active sidelink BWP associated with the UE in a frequency operation range of the component carrier.

16. The method of claim 10, wherein the sidelink BWP configuration indicates a SCI scheduling grid, wherein detecting the active sidelink BWP on the component carrier comprises detecting the active sidelink BWP on the component carrier based at least in part on randomly shifting a narrow active sidelink BWP associated with the UE on the SCI scheduling grid in a frequency operation range of the component carrier, wherein the SCI scheduling grid is configured per a minimum bandwidth of sidelink BWPs on the component carrier, and wherein a scheduling SCI is duplicated on each SCI scheduling grid.

17. The method of claim 16, further comprising:
decoding, from other UEs, the scheduling SCI that is duplicated on the SCI scheduling grid.

18. The method of claim 10, wherein detecting the active sidelink BWP on the component carrier comprises detecting the active sidelink BWP from one or more of: a plurality of fully overlapped sidelink BWPs or a plurality of partially overlapped sidelink BWPs among different UEs with different services or different UE pairs.

19. A non-transitory computer-readable medium storing a set of instructions for wireless communication, the set of instructions comprising:
one or more instructions that, when executed by one or more processors of a user equipment (UE), cause the UE to:
receive a sidelink bandwidth part (BWP) configuration, wherein the sidelink BWP configuration indicates a detection gap for active sidelink BWP detection; and
detect an active sidelink BWP on a component carrier based at least in part on:
periodic measurements during the detection gap, or
decoded scheduling sidelink control informations (SCIs) from other UEs within other active sidelink BWPs during the detection gap.

20. The non-transitory computer-readable medium of claim 19, wherein the one or more instructions, that cause the UE to receive the sidelink BWP configuration, cause the UE to:
receive the sidelink BWP configuration from a network entity, wherein the sidelink BWP configuration is based at least in part on a sidelink UE information message; or
receive the sidelink BWP configuration from a special UE, wherein the sidelink BWP configuration is based at least in part on a sidelink UE assistance information message.

21. The non-transitory computer-readable medium of claim 19, wherein:
the sidelink BWP configuration indicates a measurement threshold, and the active sidelink BWP is detected on the component carrier based at least in part on a measurement that satisfies the measurement threshold.

22. The non-transitory computer-readable medium of claim 19, wherein the active sidelink BWP is detected on the component carrier based at least in part on a random shifting of a wide active sidelink BWP associated with the UE in a frequency operation range of the component carrier.

23. The non-transitory computer-readable medium of claim 19, wherein the sidelink BWP configuration indicates other sidelink BWPs, and the active sidelink BWP is detected on the component carrier based at least in part on the decoded scheduling SCIs in accordance with a random sensing of the other sidelink BWPs.

24. The non-transitory computer-readable medium of claim 19, wherein the active sidelink BWP is detected on the component carrier based at least in part on a random shifting of a wide active sidelink BWP associated with the UE in a frequency operation range of the component carrier.

25. An apparatus for wireless communication, comprising:
means for receiving a sidelink bandwidth part (BWP) configuration, wherein the sidelink BWP configuration indicates a detection gap for active sidelink BWP detection; and
means for detecting an active sidelink BWP on a component carrier based at least in part on:
periodic measurements during the detection gap, or
decoded scheduling sidelink control informations (SCIs) from other apparatuses within other active sidelink BWPs during the detection gap.

26. The apparatus of claim 25, wherein the means for receiving the sidelink BWP configuration comprises:
means for receiving the sidelink BWP configuration from a network entity, wherein the sidelink BWP configuration is based at least in part on a sidelink user equipment (UE) information message.

27. The apparatus of claim 25, wherein:
the sidelink BWP configuration indicates a measurement threshold, and the means for detecting the active sidelink BWP on the component carrier is based at least in part on a measurement that satisfies the measurement threshold.

28. The apparatus of claim 25, wherein:
the means for detecting the active sidelink BWP on the component carrier is based at least in part on randomly shifting a wide active sidelink BWP associated with the apparatus in a frequency operation range of the component carrier; or
the sidelink BWP configuration indicates a SCI scheduling grid, wherein the means for detecting the active sidelink BWP on the component carrier is based at least in part on randomly shifting a narrow active sidelink BWP associated with the apparatus on the SCI scheduling grid in the frequency operation range of the component carrier, wherein the SCI scheduling grid is configured per a minimum bandwidth of sidelink BWPs on the component carrier, and wherein a scheduling SCI is duplicated on each SCI scheduling grid.

29. The apparatus of claim 25, wherein the means for receiving the sidelink BWP configuration comprises:
means for receiving the sidelink BWP configuration from a special UE, wherein the sidelink BWP configuration is based at least in part on a sidelink UE assistance information message.

30. The apparatus of claim 25, wherein the sidelink BWP configuration indicates other sidelink BWPs, and the means for detecting the active sidelink BWP on the component carrier is based at least in part on the decoded scheduling SCIs in accordance with a random sensing of the other sidelink BWPs.

* * * * *